Patented Aug. 1, 1939

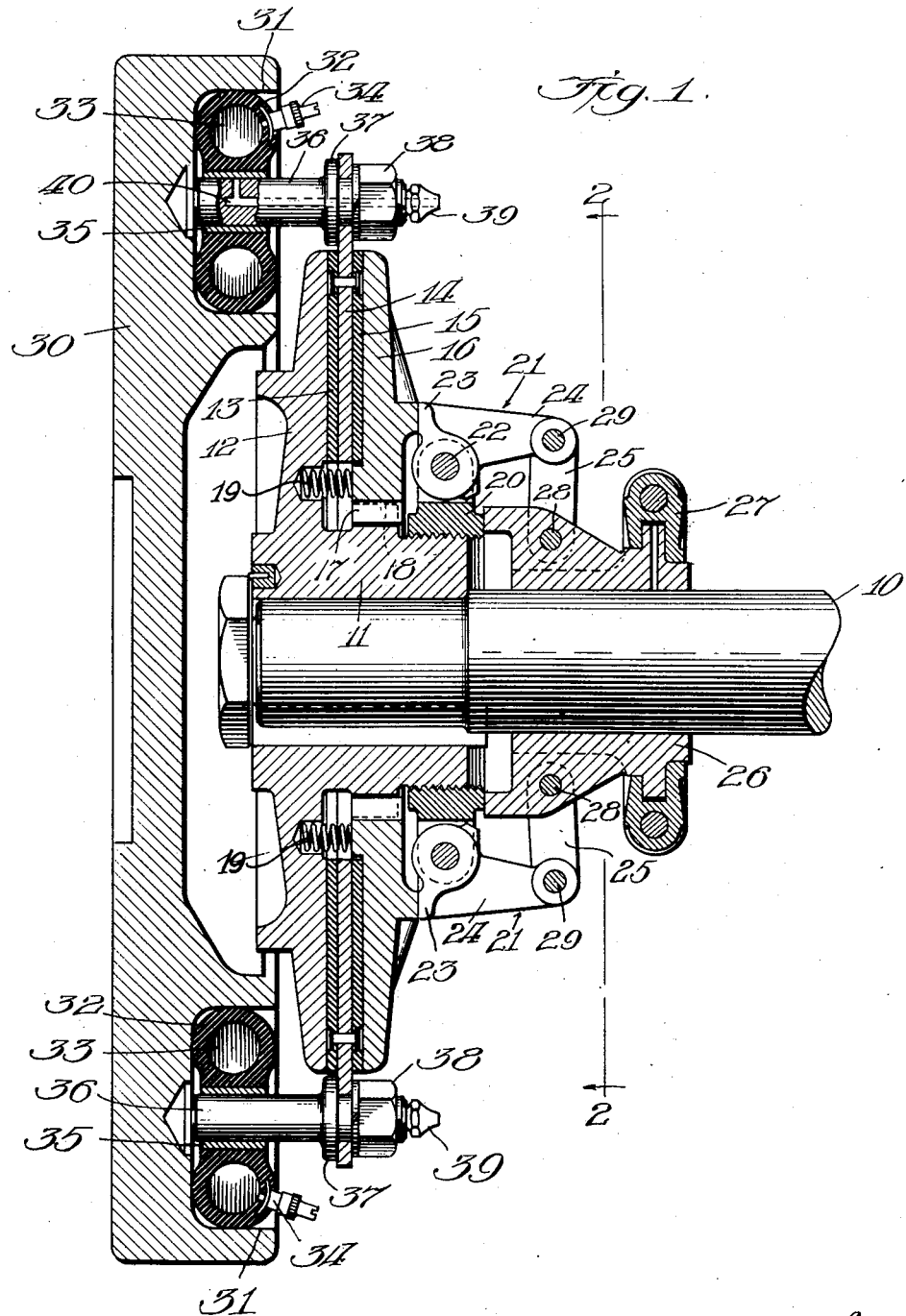

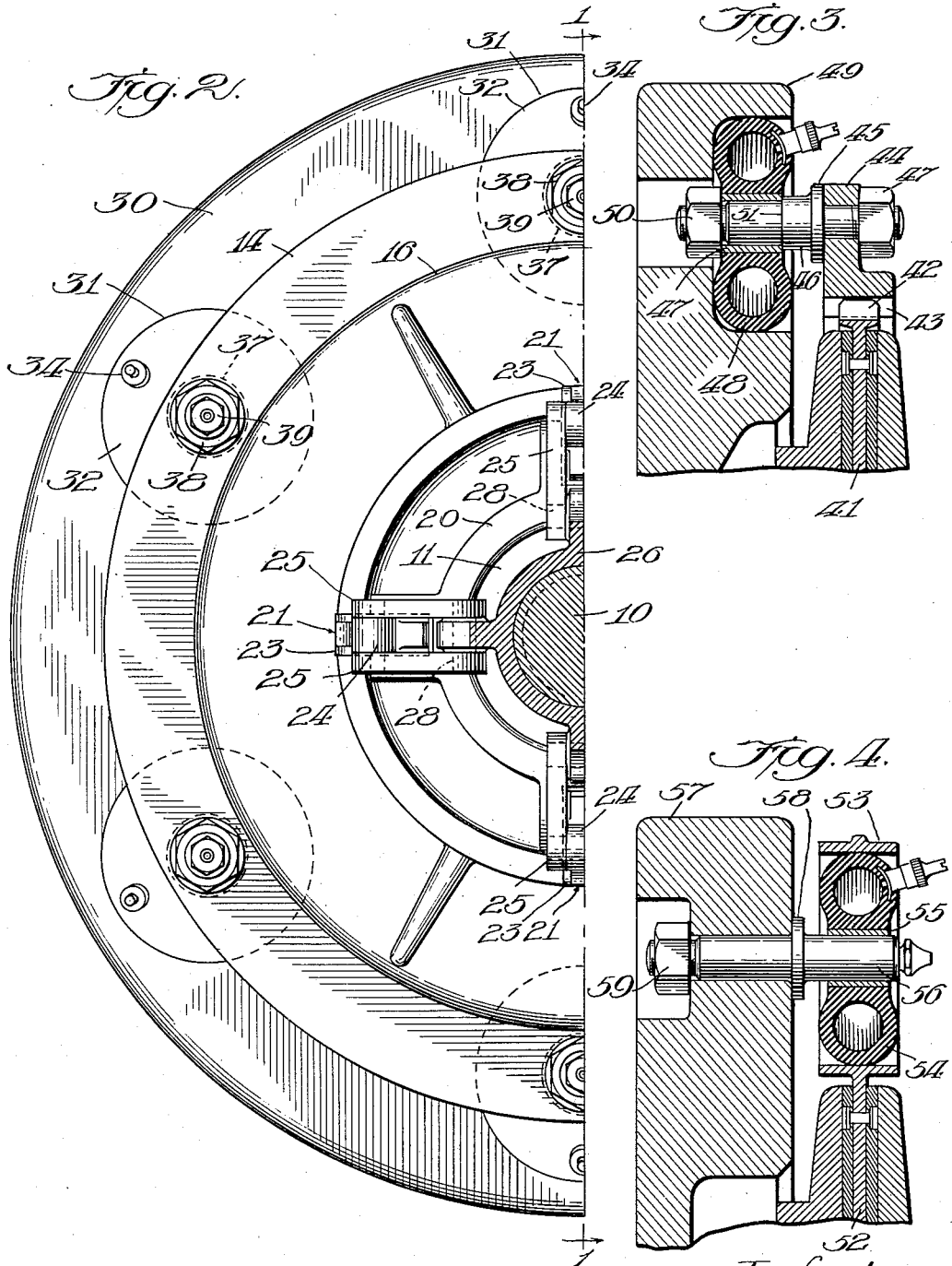

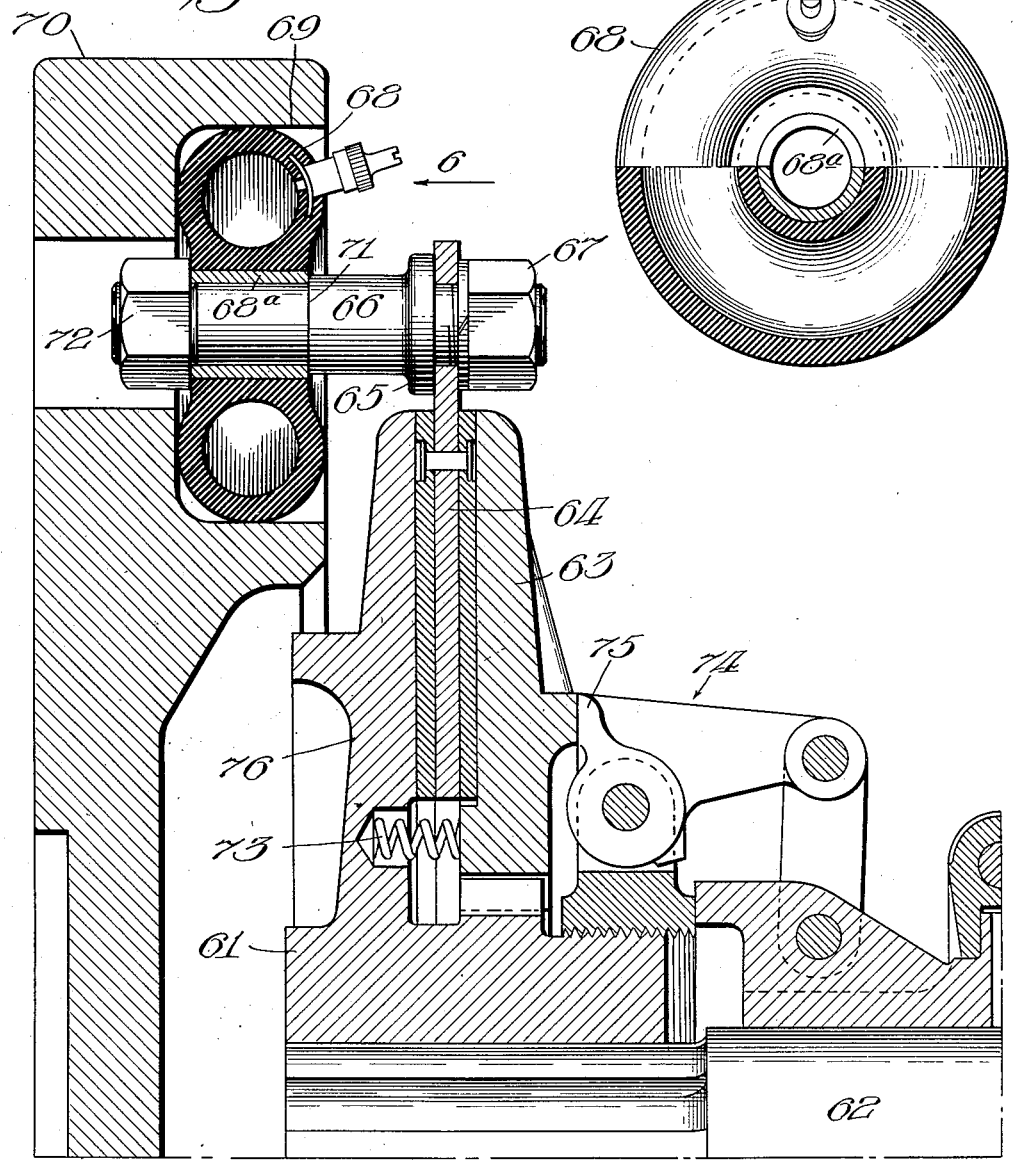

2,167,705

UNITED STATES PATENT OFFICE 2,167,705

CLUTCH MECHANISM

Percy H. Batten, Racine, Wis., assignor to Twin Disc Clutch Company, Racine, Wis., a corporation of Wisconsin Application March 23, 1936, Serial No. 70,273

15 Claims. (Cl. 192—55)

My invention relates to clutch mechanisms and more particularly to a structure which is characterized by the usual clutch features as regards controlling the interruption and establishment of power transmission between indicated parts while additionally providing for a pneumatic and elastic transmission of such power.

The principal object of my invention is to devise a clutch mechanism which is constructed and arranged to absorb shocks and jars due to torque variations, shaft misalignment or end play.

A further object is to provide a mechanism having the foregoing characteristics in which the driving plate, or the driving ring therefor, is pneumatically suspended from one of the principal members of the clutch by means of inflatable or inflated members.

These and further objects of my invention will be set forth in the following specification, reference being had to the accompanying drawings, and the novel means by which said objects are effectuated will be definitely pointed out in the claims.

In the drawings:

Figure 1 is a sectional elevation of one form of my improved clutch mechanism taken generally along the line 1—1 in Fig. 2, looking in the direction of the arrows.

Fig. 2 is an end view of one-half of the mechanism, partly in section, as taken along the line 2—2 in Fig. 1, looking in the direction of the arrows.

Figs. 3 and 4 are fragmentary, sectional views showing modified arrangements for pneumatically suspending the driving plate of the clutch from one of the principal rotary parts interconnected by the clutch, such as a flywheel and the like.

Fig. 5 is a sectional view, corresponding to that illustrated in Fig. 1, but showing a still further modification which includes a provision for permitting endwise shifting of the clutch hub on the driven shaft.

Fig. 6 is an elevation, partly in section, of one of the pneumatic members as viewed in the direction of the arrow 6 in Fig. 5.

Referring to Figs. 1 and 2 of the drawings, the numeral 10 designates a shaft which constitutes one of the elements interconnected by a clutch hereinafter described and which, in the present instance, will be considered as a driven shaft, although the conditions of operation may be reversed in this particular. Keyed or otherwise fixedly attached to the shaft is a hub 11 having preferably integrally formed therewith an annular flange defining a clamping disc 12. The right face of the disc 12 is intended to grippingly engage with a facing 13 of suitable friction material that is riveted or otherwise secured to the adjacent side of a driving plate 14, whose opposite side has similarly attached thereto a facing 15 of like material. The latter facing is engaged by a floating plate or disc 16 that is annular in shape and the inner wall of this disc is provided with a plurality of circumferentially arranged teeth 17 that are arranged in intermeshing relation with similar teeth 18 provided on the hub 11. Accordingly, the disc 16 partakes of the rotary motion of the hub 11, but is arranged for sliding movement relative thereto in endwise direction, that is, generally parallel to the axis of the shaft 10.

As more particularly described hereinafter, the driving plate 14 is also conditioned for a similar sliding movement and, when this plate and the disc 16 are free to move in a releasing direction, that is, toward the right, as viewed in Fig 1, the disc 16 is positively moved by means of the extending action of a plurality of coil springs 19, one end of each of which abuts against the adjacent face of the disc 16 and the opposite end is received within a suitable pocket provided in the disc 12.

In order to actuate the indicated discs and plate into engagement and to compensate for wear of the friction facings, an adjusting ring 20 is threaded on the hub 11 to the right of the floating disc 16 and a plurality of bell crank, clutch levers 21 is circumferentially spaced around the ring 20 and each of these levers is suitably pivoted on the ring by means of a pin 22. Each lever comprises an arm 23 which is intended to bear directly against the floating disc 16 and also an arm 24 that is pivotally secured to one end of a link 25 whose opposite end is pivotally attached to a sleeve 26 that is slidably mounted on the shaft 10. The sleeve 26 may be engaged by a collar 27 that may be provided with the usual trunnions (not shown) for actuation by a suitable shifting fork (not shown).

The foregoing clutch construction in and of itself forms no part of the present invention, but has been referred to as indicating generally a common type of clutch that is provided with a driving plate. It will be obvious, from an examination of Fig. 1, that the clutch is in driving position and will be so maintained as long as the sleeve 26 occupies the position shown in the indicated figure. In this position, each pivot pin 28 which secures the inner end of each link 25 to the sleeve 26 is located to the left, as illustrated in Fig. 1, of the radial plane which includes the pivot pins 29, thus locking the clutch in driving position. When the sleeve 26 is moved toward the right, each clutch lever is rocked to free the floating disc 16 for movement toward the right, which movement is assisted by the extending action of the springs 19. As presently described, the driving plate 14 is also free to move, so that the friction portions of the clutch easily free themselves.

The present invention is more particularly concerned with providing a pneumatic connection between the driving plate 14 and a driving member 30, such as a flywheel and the like, which constitutes the other rotary part that is interconnected by the clutch. To this end, the flywheel is provided with a plurality of circumferentially spaced pockets 31 that open toward the plate 14. A pneumatic member 32 is seated in each of these pockets and each of these members is preferably circular in shape, as indicated in Figs. 2 and 6 and includes an annular air space 33 that is preferably circular in cross section. The member 32 may be composed of any suitable material, although rubber is preferred in this respect and its general appearance approximates that of the well known "doughnut" type of vehicle tire. The member may be inflated to any desired pressure through the usual valve 34. The number of pneumatic members employed will depend upon the conditions of operation, the design illustrated showing six of these elements.

The central portion of each member 32 is perforated to receive a sleeve bushing 35 within which is slidably mounted one end of a driving pin 36 that extends outwardly of the pocket 31 and is provided with an annular flange 37 that abuts against the adjacent side of the driving plate 14, it being understood that the periphery of this plate is located at some distance beyond the peripheries of the discs 12 and 16. The pin 36 extends through a suitable aperture provided in the plate 14 and beyond the latter, the pin is threaded to receive a nut 38, between which and the flange 37 the driving plate 14 is firmly clamped. Lubrication of the pin 36 within the sleeve 35 is provided by means of an appropriate nipple 39 that is mounted in the right end of the pin 36 and which is of the general type that provides easy attachment to a grease gun or the like. The nipple 39 communicates with a lubricating passage 40 provided in the pin and which terminates at the cylindrical surface thereof.

From the foregoing, it will be understood that the driving plate 14 is literally pneumatically and elastically suspended from the flywheel 30 and, by reason of the slidable support of the driving pins 36 in the pneumatic members, the driving plate 14 can be readily shifted into driving position by the floating disc 16, or will readily disengage itself when free to do so.

The pressure to which the pneumatic members is inflated will depend upon the type and capacity of the clutch, but, in general, the pressure will bear a suitable relation to the maximum torque of the clutch at the radius of the pins 36. Further, this pressure should be arranged to permit a slight compression of each pneumatic member when running and also when starting under load. The construction is therefore particularly adapted to compensate for torque variations by absorbing torque strains, such as those created by the torque of the driving shaft when the power is initially applied, or by the resistance to the torque of the driven shaft when the latter encounters any sudden and momentary resistance to rotation. The mechanism is also useful in smoothing out unabsorbed power impulses when used in conjunction with an internal combustion engine having a light flywheel. In other words, the construction provides a very effective means for absorbing shocks and jars generally in devices of this type, whether these undesirable factors are due to torque variations, shaft misalignment or end play. It is contemplated that the rubber of which each pneumatic member is composed will have a very high stress characteristic in order to carry the extreme loads of operation without taking a permanent set.

In Fig. 3 is illustrated a modification of the structure heretofore described. In this arrangement, the clutch proper is, or may be, identical with that heretofore illustrated, the principal difference consisting in the fact that the driving plate 41 is provided with a plurality of peripheral gear teeth 42 which are arranged in intermeshing relation with similar teeth 43 provided on a driving ring 44. This ring is clamped between a flange 45 provided on a driving pin 46 and a nut 47 that is threaded on the pin, this particular feature of construction approximating that illustrated in Fig. 1. The opposite end of the pin 46 is mounted in a sleeve bushing 47 provided in a pneumatic member 48 that is mounted as heretofore described in a driving member, such as a flywheel 49. The portion of the pin 46 that extends through the pneumatic member 48 is fixedly attached thereto by means of a nut 50 that is threaded on the pin and which draws an annular shoulder 51 also provided on the pin against the adjacent end of the sleeve 47.

The arrangement illustrated in Fig. 3 generally differs from that shown in Fig. 1 in that the driving pin 46 is fixed relative to the pneumatic members 48. Endwise movement of the driving plate 41 is provided by its tooth engagement with the driving ring 44.

In Fig. 4 is illustrated a still further modification which, however, contemplates the use of a clutch construction similar to that illustrated in Fig. 1, as far as the use of a driving plate and the fixed attachment of the hub 11 to the shaft 10 is concerned. In this modification, the numeral 52 designates a driving plate which is provided outwardly of the clamping disc of the clutch with a plurality of circumferentially spaced, circular shells 53, each of which receives a pneumatic member 54 having the general shape heretofore described. Each of these members is centrally apertured to receive a sleeve 55 within which is slidably mounted one end of a driving pin 56. To the left of the driving plate, each pin 56 extends through a suitable aperture provided in a driving member, such as a flywheel 57 and a flange 58 is formed on each pin for abutment against the adjacent face of the flywheel and each pin is held in the position just mentioned by means of a nut 59 that is threaded on the pin.

The modification illustrated in Fig. 4 provides for an endwise shifting of the driving plate 52 because of the slidable mounting of each driving pin 56 relative to its associated pneumatic member 54. The principal distinction between this modification and those heretofore described resides in the support of the pneumatic members on the driving plate itself.

In Fig. 5 is illustrated a still further modification which also employs a clutch construction similar to that already described, with one exception, namely, the fact that the clutch hub 61 is slidably mounted on the driven shaft 62, as by means of a spline connection therewith. Since the floating disc 63 of the clutch is arranged for a sliding movement relative to the hub 61, it will be obvious that, in the present modification, it is unnecessary to provide for any endwise movement of the driving plate 64.

Accordingly, this plate, outwardly of the clamping disc of the clutch, is clamped between a plurality of flanges 65 provided on a plurality of circumferentially spaced, driving pins 66, the flanges being located on one side of the driving plate and a nut 67 being threaded on each pin on the other side of the plate, the fastening being generally similar to that illustrated in Figs. 1 and 3. The opposite end of each pin 66 is mounted in a sleeve bushing 68ª provided in a pneumatic member 68 that is seated in a pocket 69 provided in a driving member, such as the flywheel 70. The pneumatic member 68 is fixed relative to the pin 66 by being clamped between a shoulder 71 provided on the pin and a nut 72 threaded on the pin.

Since, in this construction, the driving plate 64 is fixed relative to the flywheel 70, separating and engaging movements of the clamping discs of the clutch are provided by moving these discs themselves through the medium of the springs 73 and actuating mechanism, generally indicated by the numeral 74, in which the component parts are substantially identical with that illustrated in Fig. 1. When this actuating mechanism is operated to engage the clutch, it will be obvious that the clamping disc 63 will be moved into engagement with the friction facing on the driving plate 64 and that, thereafter, the instantaneous fulcrum provided by the contact of the arms 75 of the actuating mechanism against the floating disc 63 will serve to draw the other clamping disc 76 into engagement with the friction facing on the opposite side of the driving plate 64.

I will be understood that a plurality of pneumatic members and driving pins are employed in the modifications illustrated in Figs. 3, 4, and 5.

As far as the pneumatic suspension of the driving plate is concerned, each of the modifications heretofore described is characterized by the advantages already noted. The different arrangements, however, illustrate the easy adaptability of this particular form of construction to a wide variety of operating conditions.

I claim:

1. In clutch construction, the combination of a clutch plate, a pair of clamping disks located on opposite sides of the plate and adapted to grippingly engage therewith, the plate and disks forming part of a clutch, one of the disks having a hub for fixed attachment to a shaft constituting one of the elements interconnected by the clutch and the other disk being rotatably connected to the hub and movable axially relative thereto, a rotary part constituting the other element interconnected by the clutch and including a plurality of circumferentially spaced pockets in one face thereof, and means for drivably connecting the plate and rotary part comprising a cushion member positioned in each socket and a pin mounted in each member and additionally supported in the plate.

2. In clutch mechanism, the combination of a plate, a pair of clamping disks located on opposite sides of the plate and adapted to grippingly engage therewith, the plate and disks forming part of a clutch, one of the disks having a hub for fixed attachment to a shaft constituting one of the elements interconnected by the clutch and the other disk being rotatably connected to the hub and movable axially relative thereto, a rotary part constituting the other element interconnected by the clutch and including a plurality of circumferentially spaced pockets in one face thereof, and means for drivably connecting the plate and part comprising a cushion member positioned in each socket and a pin slidably mounted in each member and additionally supported in the plate.

3. In clutch construction, the combination of a plate, a pair of clamping disks located on opposite sides of the plate and adapted to grippingly engage therewith, the plate and disks forming part of a clutch, one of the disks having a hub for slidable mounting on a shaft constituting one of the elements interconnected by the clutch and the other member being rotatably connected to the hub and movable axially relative thereto, a rotary part constituting the other element interconnected by the clutch and including a plurality of circumferentially spaced pockets in one face thereof, and means for drivably connecting the plate and part comprising a cushion member positioned in each socket and a pin fixedly mounted in each member and additionally fixed in the plate.

4. In clutch construction, the combination with first and second, separately mounted, rotary members adapted to be interconnected by a clutch, the first member including a plurality of circumferentially spaced pockets in one face thereof, of a friction plate, a pair of clamping disks secured to the second member for engaging opposite sides of the plate, the plate and disks constituting the interconnecting clutch, and means for drivably connecting and solely supporting the plate to and on the first member comprising a cushion device positioned in each pocket and a pin mounted in each device and additionally supported in the plate.

5. In clutch construction, the combination with first and second, separately mounted, rotary members adapted to be interconnected by a clutch, the first member including a plurality of circumferentially spaced pockets in one face thereof, of a friction plate, a pair of clamping disks secured to the second member for engaging opposite sides of the plate, the plate and disks constituting the interconnecting clutch, and means for drivably connecting and solely supporting the plate to and on the first member comprising a cushion device positioned in each pocket and a pin slidably mounted in each device and additionally supported in the plate.

6. In clutch construction, the combination of a pair of independently mounted rotary parts, clutch members carried by one part forming a portion of a clutch having a driving plate for connecting the parts, and means for drivably and solely supporting the plate on the other part comprising a plurality of cushion devices carried by said other part and a driving pin mounted in each device and having driving connection with the plate.

7. In clutch construction, the combination of a pair of independently mounted rotary parts, clutch members carried by one part forming a portion of a clutch having a driving plate for connecting the parts, and means for drivably and solely supporting the plate on the other part comprising a plurality of cushion devices carried by said other part and a driving pin slidably mounted in each device and having driving connection with the plate.

8. In clutch construction, the combination of a pair of independently mounted rotary parts, clutch members carried by one part forming a portion of a clutch having a driving plate for connecting the parts, and means for drivably and solely supporting the plate on the other part comprising a plurality of annular, cushion devices carried by said other part and a driving pin mounted in each device and having driving connection with the plate.

9. In clutch construction, the combination of a friction part, a pair of clamping disks located on opposite sides of the part and adapted to grippingly engage therewith, the friction part and disks forming a portion of a clutch for establishing a driving connection between rotary parts, a plurality of circumferentially spaced cushion members carried by the friction part, and a pin mounted in each member and adapted for driving connection with one of the rotary parts.

10. In clutch construction, the combination of a friction part, a pair of clamping disks located on opposite sides of the friction part and adapted to grippingly engage therewith, the friction part and disks forming a portion of a clutch for establishing a driving connection between rotary parts, a plurality of circumferentially spaced cushion members carried by the friction part, and a pin slidably mounted in each member and adapted for driving connection with one of the rotary parts.

11. In clutch construction, the combination of a plate having a plurality of circumferentially spaced shells, a pair of rotatably connected clamping disks located on opposite sides of the plate and adapted to grippingly engage therewith inwardly of the shells, the plate and disks forming part of a clutch for establishing a driving connection between rotary parts, a cushion member positioned in each shell, and a pin mounted in each member and adapted for driving connection with one of the rotary parts.

12. In clutch construction, the combination of a plate having a plurality of circumferentially spaced shells, a pair of rotatably connected clamping disks located on opposite sides of the plate and adapted to grippingly engage therewith inwardly of the shells, the plate and disks forming part of a clutch for establishing a driving connection between rotary parts, a cushion member positioned in each shell, and a pin slidably mounted in each member and adapted for driving connection with one of the rotary parts.

13. In clutch construction, the combination of a plate having a plurality of circumferentially spaced shells, a pair of clamping disks located on opposite sides of the plate and adapted to grippingly engage therewith inwardly of the shells, the plate and disks forming a part of a clutch for establishing a driving connection between rotary parts, one of the disks having a hub for fixed attachment to one of the parts and the other disk being rotatably connected to the hub and movable axially relative thereto, a cushion member positioned in each shell, and a pin slidably mounted in each member and adapted for driving connection with the other of the rotary parts.

14. In clutch construction, the combination of a clutch having a driving plate for connecting rotary parts, the plate being provided with a plurality of circumferentially spaced shells, and means for solely and drivably supporting the plate on one of the parts comprising a cushion member positioned in each shell, and a pin mounted in each member and adapted for driving connection with said one part.

15. In clutch construction, the combination of a clutch having a driving plate for connecting rotary parts, the plate being provided with a plurality of circumferentially spaced housings projecting laterally therefrom, and means for drivably supporting the plate on one rotary part comprising a cushion member positioned in each housing and a pin journaled in each member and adapted for driving connection with said one part.

PERCY H. BATTEN.